(12) United States Patent
Nedele et al.

(10) Patent No.: US 6,840,339 B1
(45) Date of Patent: *Jan. 11, 2005

(54) TOWBAR HEAD FOR A TOWBAR-GUIDED INDUSTRIAL TRUCK

(75) Inventors: Hartmut Nedele, Metzingen (DE); Pierre Maller, Glattbach (DE); Edgar Weber, Albstadt (DE); Eugen Schöller, Balingen (DE); Frederic Bruder, Senlis (FR)

(73) Assignee: Still & Saxby S.A.R.L. (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/124,310

(22) Filed: Jul. 29, 1998

(30) Foreign Application Priority Data

Jul. 30, 1997 (DE) .......................... 197 32 890

(51) Int. Cl.⁷ ............................................. B62D 51/04
(52) U.S. Cl. ..................................... 180/19.1; 180/19.3
(58) Field of Search ..................... 280/422; 180/19.3, 180/333, 19.1

(56) References Cited

U.S. PATENT DOCUMENTS

| | | | | |
|---|---|---|---|---|
| 4,283,072 A | * | 8/1981 | Deloach, Jr. ................. 280/422 |
| 4,308,439 A | * | 12/1981 | Itoh ......................... 200/159 B |
| 4,405,841 A | * | 9/1983 | Van Zeeland .............. 200/11 R |
| 4,493,219 A | * | 1/1985 | Sharp et al. .............. 73/862.05 |
| 4,845,803 A | * | 7/1989 | King ........................... 180/19.3 |
| 5,042,314 A | * | 8/1991 | Rytter et al. ................. 180/333 |
| 5,361,644 A | | 11/1994 | Nedele et al. |
| 5,430,262 A | * | 7/1995 | Matsui et al. ................ 200/5 A |
| 5,508,703 A | * | 4/1996 | Okamura et al. ............ 341/176 |
| 5,586,668 A | * | 12/1996 | Miller ......................... 280/422 |
| 5,675,309 A | * | 10/1997 | DeVolpi ....................... 338/68 |
| 5,909,891 A | * | 6/1999 | Swart et al. ................. 180/422 |
| 5,952,630 A | * | 9/1999 | Filion et al. ................. 200/5 R |
| 6,285,276 B1 | * | 9/2001 | Nedele et al. ............... 338/160 |

FOREIGN PATENT DOCUMENTS

| | | |
|---|---|---|
| DE | 3811009 | 11/1988 |
| DE | 4111675 | 6/1994 |
| DE | 9417201 | 2/1995 |
| DE | 4444772 | 6/1996 |

* cited by examiner

Primary Examiner—Daniel G. DePumpo
(74) Attorney, Agent, or Firm—Webb Ziesenheim Logsdon Orkin & Hanson, P.C.

(57) ABSTRACT

A towbar head for a towbar-guided industrial truck includes control elements located on the towbar head. The control elements control various functions of the industrial truck such as the propulsion and/or the controls for a lifting device. The control elements are effectively connected to signal generators (4, 5) to generate electrical control signals. The invention teaches that there are at least two signal generators (4, 5) which are preferably in the form of membrane switches located on a common circuit board (3). In one embodiment, at least-one membrane switch has a plurality of contact areas 4b, 5b) located on the common circuit board (3). The common circuit board (3) has at least one contact membrane (13) that can be electrically connected with a contact surface (4a, 4b, 5a, 5b) or a resistance track by a pressure force exerted on the contact membrane (13). Preferably, all the signal generators located on the common circuit board (3) are in the form of membrane switches.

28 Claims, 3 Drawing Sheets

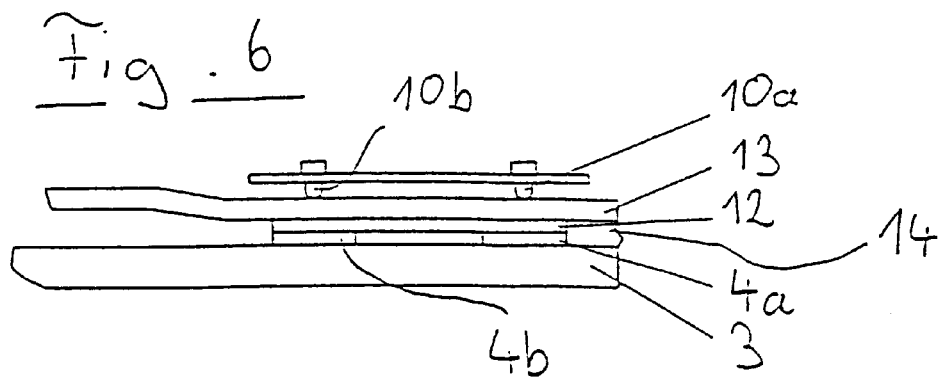
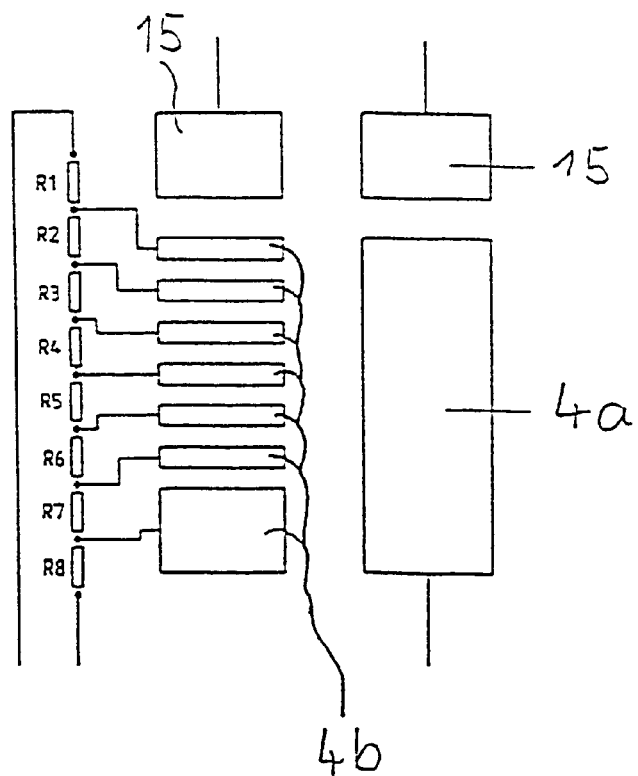

TOWBAR HEAD FOR A TOWBAR-GUIDED INDUSTRIAL TRUCK

BACKGROUND OF THE INVENTION

The invention relates to a towbar head for a towbar-guided industrial truck. Control elements for controlling various functions of the industrial truck, such as control elements for propulsion or for a lifting device are located on the towbar head. The control elements are effectively connected to signal generators to generate electrical control signals.

Towbar-guided industrial trucks are realized, for example, in the form of electrically propelled low-lift trucks or high-lift trucks which can be realized in the form of trucks where the operator walks alongside or trucks which have a driver's seat. Towbar heads of the type described above generally have control elements for the propulsion system, the lifting device, an auxiliary lifting device, a horn and a safety switch. The control elements listed above are connected to signal generators, by means of which on/off control signals, multi-stage control signals or stepless control signals are generated.

For example, DE 44 44 772 discloses the installation of a plurality of microswitches to generate on/off control signals on a common circuit board. On this towbar head, a potentiometer to generate a stepless control signal for propulsion is realized in the form of a component that is separated from the circuit board. In this case, the commercial potentiometer used takes up a significant amount of space. There are no additional signal generators for stepless or multi-stage control signals. Thus, the microswitches used have a large number of moving mechanical parts, and therefore have a limited useful life.

Therefore, it is an object of the invention to make available a simple towbar head which is less susceptible to wear and is characterized by the ability to perform a plurality of functions, a high degree of integration and a small number of components.

SUMMARY OF THE INVENTION

The invention teaches that this object can be accomplished if at least two signal generators are located on a common circuit board and are configured in the form of membrane switches. The membrane switches can be configured to generate on/off control signals, multi-stage or stepless control signals. The invention teaches that at least two membrane switches are located jointly on one circuit board. The various types of membrane switches, e.g. with a pressure-sensitive resistance membrane (force sensitive resistor) or with a contact membrane (membrane rectilinear transducer) are characterized by their small size, high resistance to wear and a small number of required components.

It is particularly advantageous if at least one of the membrane switches located on the common circuit board can be used to generate a stepless or a multi-stage control signal, and at least one of the membrane switches located on the common circuit board can be used to generate an on/off control signal. In that manner, different functions of the industrial truck can be controlled by the membrane switches which are located on the common circuit board.

In one advantageous configuration of the invention, at least one membrane switch has a plurality of contact areas located on the common circuit board. In this case, the membrane switch can be used for the generation of a multi-stage control signal. In another embodiment, at least one membrane switch has at least one resistance track located on the common circuit board. In that case, it becomes possible to use the membrane switch to generate a stepless control signal. The contact areas and the resistance track are attached directly to the common circuit board, as a result of which there is no need for a separate fastening element. Smaller contact areas are also referred to as "contact points" in the following portion of this description.

It is preferable if the common circuit board has at least one contact membrane which can be electrically connected with a contact area or a resistance track by means of a pressure force exerted on the contact membrane. The electrically conducting contact membrane is pressed by the pressure force onto at least one contact point located on a circuit board or onto the resistance track, whereby an electrical connection is created between the membrane film and the contact point or the resistance track. The membrane switch changes its resistance depending on the location at which the pressure force is applied. This location is determined by the operator by positioning the control element. When a resistance track is used, it is possible to generate a stepless control signal, or when a plurality of contact points located in a row are used, it is possible to generate a multi-stage control signal. An individual switch of the prior art and of the type described above with a resistance track is described, for example, in DE-GM 94 17 201.

In another advantageous embodiment of the invention, at least one membrane switch has at least one pressure-sensitive resistance membrane. The pressure-sensitive resistance membrane changes its resistance as a function of a pressure force exerted by the operator. As a result of this continuously changing resistance value, it becomes possible to generate a stepless control signal.

In particular when membrane switches of one of the types described above are used to generate multi-stage or stepless control signals, there are significant savings in terms of the size of the components, as well as a significant reduction in the number of components required. There are also advantages if signal generators for the generation of on/off signals are formed by membrane switches. In that case, it becomes possible to eliminate the need for microswitches, which are susceptible to wear.

It is particularly advantageous if all of the signal generators located on the common circuit board are realized in the form of membrane switches.

It is also particularly appropriate if the electrical components fastened to the circuit board are located exclusively on the side facing away from the contact membrane. On one side of the common circuit board, there is the contact membrane which can be connected by a pressure force with a resistance track or contact point attached to the circuit board. All of the electrical components, e.g. resistors, capacitors or transistors, located on the circuit board are on the other side of the circuit board.

In one configuration of the invention, a signal generator for the generation of a multi-stage or stepless control signal corresponding to the speed of travel of the industrial truck is located on the common circuit board. In this case, it is also appropriate if a signal generator for the generation of an on/off control signal for the direction of travel of the industrial truck is located on the common circuit board. Thus for the propulsion of the industrial truck there are two control signals, separated from one another, which can be generated using the same control element. The propulsion is engaged only when a corresponding signal is generated by both signal generators. In the present invention, a two-channel signal generation capability for propulsion is guaranteed, whereby the two signal generators are located on the same circuit board and thus the number of components is significantly reduced with respect to a conventional towbar head.

It is also appropriate if, on the common circuit board, there is a signal generator which generates a multi-stage or stepless control signal for the ascending speed of a lifting device. Analogously, on the common circuit board there is a signal generator to generate a multi-stage or stepless control signal for the descending speed of a lifting device. For this purpose there are two separate control elements, each of which has its own signal generator.

In an additional embodiment of the invention, there are respective individual signal generators on the common circuit board to generate an on/off signal for a horn and/or to raise an auxiliary lifting device and/or to lower an auxiliary lifting device. The auxiliary lifting device represents an additional lifting device that can be operated at least to some degree independently of the lifting device described above. For the auxiliary lifting device, there are also two control elements that are independent of one another and two signal generators that are independent of one another.

BRIEF DESCRIPTION OF THE DRAWINGS

Additional advantages and details of the invention are explained in greater detail below with reference to the exemplary embodiment of the invention illustrated in the accompanying schematic drawings, in which:

FIG. 5 shows a circuit board of a membrane switch element in an overhead view; and FIG. 6 shows a membrane switch element in end view.

DESCRIPTION OF THE PREFERRED EMBODIMENTS

Figure 1:
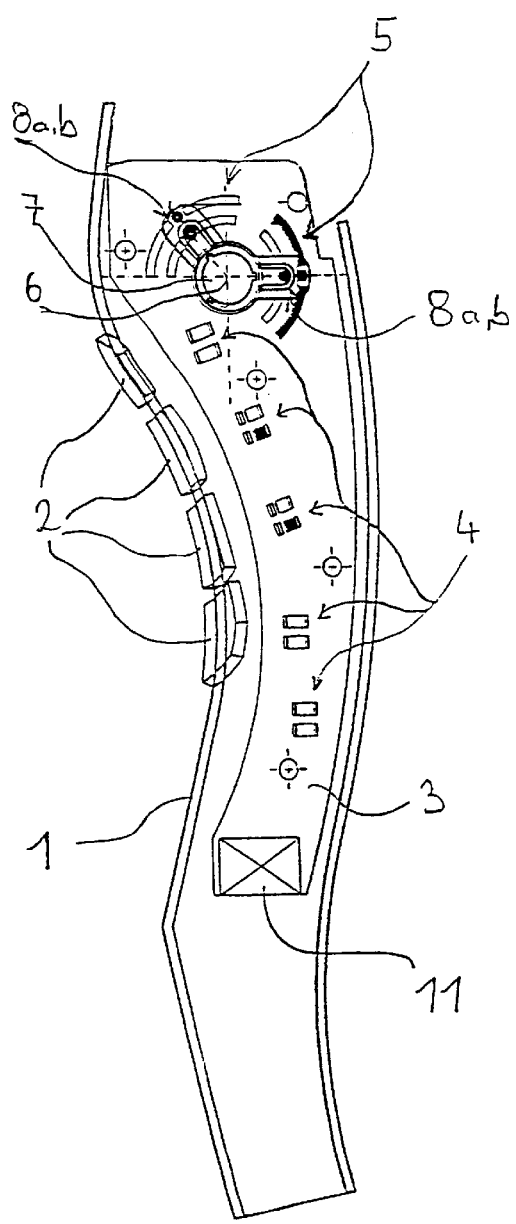
FIG. 1 shows a towbar of the invention, in longitudinal section from the side.

FIG. 1 shows the towbar head of a towbar as claimed by the invention for an industrial truck, in longitudinal section from the side. On an upper side of a housing 1 of the towbar head, there are control elements realized in the form of buttons 2 to actuate, for example, a lifting device, an auxiliary lifting device and a horn. There may be two buttons 2 located next to one another, i.e., one of them not being visible in this drawing. Inside the housing 1 there is a circuit board 3, on which, the invention teaches, signal generators 4 of the control elements are located. In the illustrated embodiment there is one signal generator 4 for each button 2. On the circuit board 3 there are also two other signal generators 5 for the propulsion of the industrial truck. A rotational shaft 7 of a control element realized in the form of a rotary control switch for the propulsion of the industrial truck is designed so that it can rotate around a shaft 6. Fastened to the shaft 7 are sliders 8a, b, which are parts of the signal generator 5, as will be further explained hereinbelow. All of the control signals generated with the signal transmitters 4, 5 can be received via a common plug-in connector 11. The signal generators 4 are assigned the following functions, in sequence from top to bottom in the accompanying drawing: horn, main lifter up, main lifter down, auxiliary lifter up, auxiliary lifter down.

Figure 2:
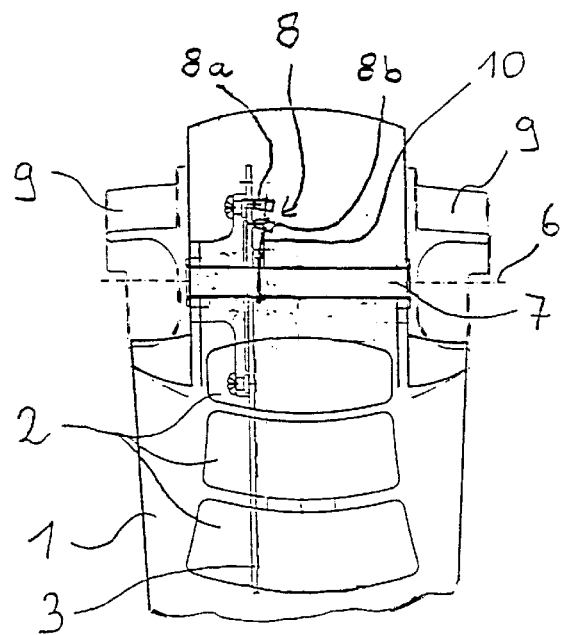
FIG. 2 shows a towbar of the invention, in longitudinal section from the top.

FIG. 2 shows a portion of the towbar head viewed in longitudinal section from the top. The figure shows two actuator bodies 9 of the rotary control switch connected to the shaft 7. The two sliders 8a, b connected to the shaft 7 are pressed by means of a leaf spring 10 against a contact membrane which is not shown in this figure and which is located between the sliders 8a, b and the circuit board 3. When the rotary control switch is actuated, the sliders 8a, b are moved along an arc over the contact membrane.

Figure 3:
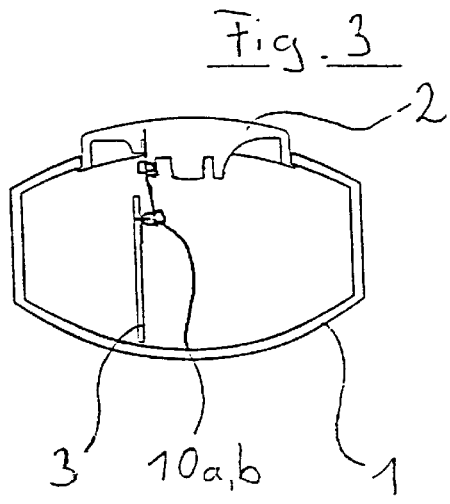
FIG. 3 shows a towbar of the invention, in cross section.

The corresponding arrangement of a signal generator 4 for a pushbutton switch is illustrated in FIG. 3. When the button 2 is pushed, two sliders 10a, b, which overlap one another in this view, move in a straight line over the contact membrane located between the sliders 10a, b and the circuit board 3.

Figure 4:
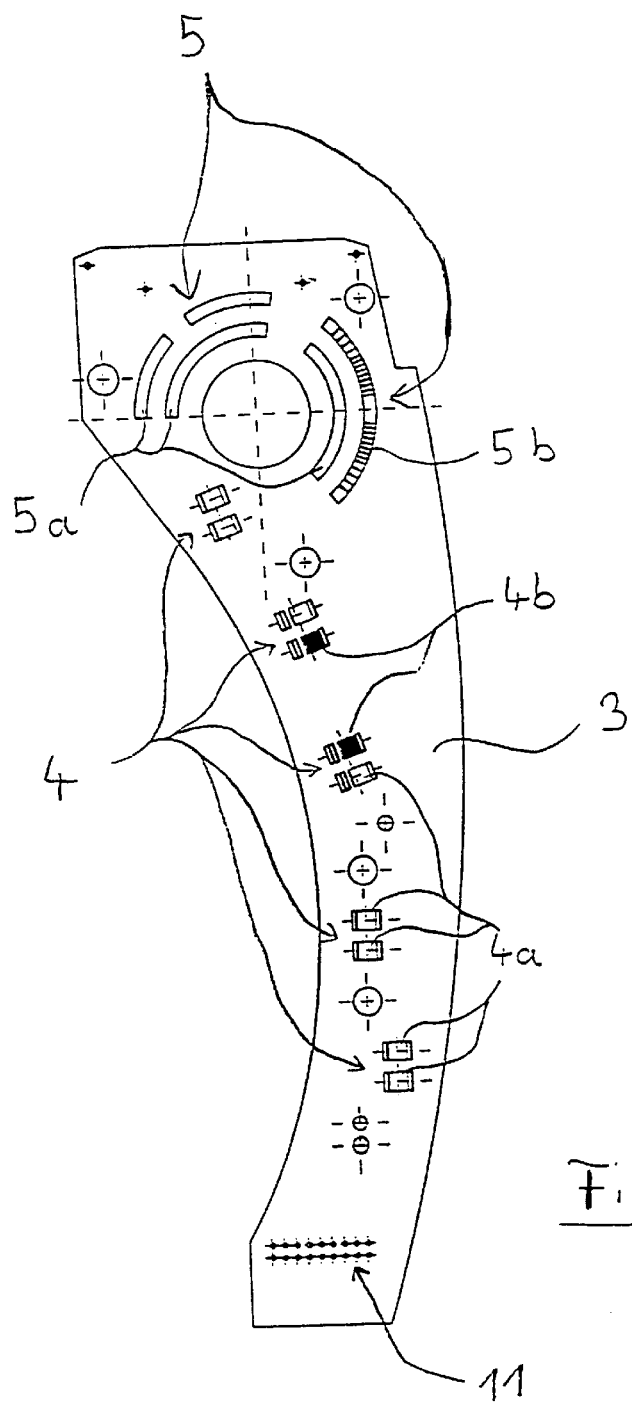
FIG. 4 shows a common circuit board of the invention.

FIG. 4 illustrates the layout of the signal generators 4, 5 on the common circuit board 3. Each signal generator thereby has two contact rails located next to one another, which can be electrically connected to one another by means of the sliders 8a, b over the contact membrane, as will be explained hereinbelow. The continuous contact areas 4a, 5a are shown as white areas in this illustration. The circuit elements to generate an on/off control signal, e.g. for a horn or an auxiliary lifting device, have two continuous contact areas 4a which are located next to one another.

On circuit elements to generate a multi-stage control signal, e.g. for propulsion or for the operation of the lifting device, in addition to a continuous contact area 4a, 5a, there is a contact rail that consists of a plurality of contact points 4b, 5b located one behind the other. The contact points 4b located one behind the other are illustrated as solid black areas.

FIG. 5 is a schematic diagram of a circuit element with the contact points 4b and the contact area 4a on the circuit board 3 for the generation of a multi-stage control signal. The drawing also shows the location of a series of resistors R1 to R8, whereby each contact point 4b is connected/with a connecting line between two resistances. The distances between the contact points 4b are sufficiently wide such that when the circuit element is actuated, at least one contact point 4b is connected with the membrane film at all times. The bottom contact point 4b shown in FIG. 5, above which the slider 10b is located when the circuit element is actuated in the limit position, is wider than the other contact points 4b. It is thereby guaranteed that when the circuit element is actuated in the limit position, the slider 10b can in no case be moved beyond the lowest contact point 4b illustrated in the drawing. As shown in FIG. 5, above each of the contact points 4b and the contact area 4a, there is an additional contact point 15, which contact points 15 can be connected to one another by means of the sliders 8a, b over the contact film 14 of the contact membrane 13 when the circuit element is in the neutral position. By means of the additional contact points 15, the neutral position of the circuit element can be detected by means of a separate electrical circuit (not shown), which meets the requirements for two-channel signal processing.

In a circuit element for the generation of a stepless control signal, a continuous resistance track that can be brought into contact with the contact membrane is attached instead of the contact points 4b and the resistors R1–8.

FIG. 6 is an end view of the circuit element. On an essentially rigid circuit board 3 there are a plurality of contact points 4b which, in this view, partly conceal one another, as well as a contact area 4a. Spaced from the contact points 4b and the contact area 4a there is a contact membrane 13 which is provided with an electrically conducting layer 12. When the circuit element is not actuated, the contact points 2 are electrically isolated from the contact area 4a by means of a spacer 14 that produces an air gap.

When the circuit element is actuated, the slider 10b exerts a pressure force on the contact membrane 13 in the vicinity of a contact point 4b. Simultaneously, the second slider 10a presses on the contact membrane 13 in the vicinity of the contact area 4a. The conducting layer 12 of the contact membrane 13 is thereby connected with the contact area 4a and, depending on the position of the slider 8b, with a specified contact point 4b. The air gap is then bridged by the elastic deformation of the contact membrane 13 in the vicinity of the sliders 10a, b. In the system described above, there is no current flow through the sliders 10a, b. The sliders 10a, b press against the contact membrane 13 with a constant force regardless of the position of the circuit element. The sliders 8a, b operate in similar fashion.

It will readily be appreciated by those skilled in the art that modifications may be made to the invention without departing from the concepts disclosed in the foregoing description. Such modifications are to be considered as included within the scope of the following claims unless the claims, by their language, expressly state otherwise. Accordingly, the particular embodiments described in detail hereinabove are illustrative only and are not limiting as to the scope of the invention, which is to be given the full breadth of the appended claims and any and all equivalents thereof.

We claim:

1. A control unit for a control unit guided industrial truck, comprising:
   control elements mounted on the control unit for controlling the industrial truck;
   a circuit board mounted within the control unit;
   at least two signal generators mounted on the circuit board for the generation of electrical control signals;
   a membrane mounted within the control unit between the control elements and the signal generators;
   at least one electrically conductive layer on the membrane, wherein the control elements are engageable with the membrane to have the at least one electrically conductive layer be electronically connectable to respective signal generators, wherein the at least one electrically conductive layer forms membrane switches for the signal generators.

2. The control unit as claimed in claim 1, wherein at least one of the membrane switches is located on the circuit board and is configured to generate one of a stepless and a multi-stage control signal and at least one of the membrane switches is located on the circuit board and is configured to generate an on/off control signal.

3. The control unit as claimed in claim 1, wherein at least one of the membrane switches includes a plurality of contact surfaces located on the circuit board.

4. The control unit as claimed in claim 1, wherein at least one of the membrane switches has at least one resistance track located on the circuit board.

5. The control unit as claimed in claim 3, including at least one of the electrically conductive layers connectable with one of a contact area and a resistance track on the circuit board by a pressure force exerted on the membrane.

6. The control unit as claimed in claim 1, wherein at lease one of the membrane switches has at least one pressure-sensitive resistance membrane.

7. The control unit as claimed in claim 1, wherein the signal generators located on the circuit board are formed by membrane switches.

8. The control unit as claimed in claim 5, wherein electrical components fastened to the circuit board are located on a side of the circuit board facing away from the membrane.

9. The control unit as claimed in claim 1, including at least one of the signal generators configured to generate one of a multi-stage and stepless control signal for a speed of travel of the industrial truck.

10. The control unit as claimed in claim 1, including at least one of the signal generators configured to generate an on/off signal for a direction of travel of the industrial truck.

11. The control unit as claimed in claim 1, including at least one of the signal generators configured to generate one of a multi-stage and stepless control signal for a ascending speed of a lifting device.

12. The control unit as claimed in claim 1, including at least one of the signal generators configured to generate one of a multi-stage and stepless control final for a descending speed of a lifting device.

13. The control unit as claims in claim 1, including one of the signal generators configured to do one of generating an on/off signal for a horn, raising an auxiliary lifting device, and lowering an auxiliary lifting device.

14. The control unit as claimed in claim 2, wherein at least one of the membrane switches includes a plurality of contact surfaces located on the circuit board.

15. The control unit as claimed in claim 2, wherein at least on of the membrane switches has at least one resistance track located on the circuit board.

16. The control unit as claims in claim 3, wherein at least one of the membrane switches has at least one resistance track located on the circuit board.

17. The control unit as claimed in claim 4, including at least one contact membrane electrically connectable with one of a contact area and a resistance track on the circuit board by a pressure force exerted on the membrane.

18. The control unit as claimed in claim 3, wherein at least one of the membrane switches has at least one pressure-sensitive resistance membrane.

19. The control unit as claimed in claim 6, wherein electrical components fastened to the circuit board are located exclusively on a side facing away from the membrane.

20. The control unit as claimed in claim 7, wherein electrical components fastened to the circuit board are located on a side of the circuit board facing away from the membrane.

21. A towbar head for a towbar guided industrial truck, comprising:
   control elements mounted on the control unit for controlling the industrial truck;
   a circuit board mounted within the control unit;
   at least two signal generators mounted on the circuit board for the generation of electrical control signals;
   a membrane mounted within the control unit between the control elements and the signal generators;
   at least one electrically conductive layer on the membrane, wherein the control elements are engageable with the membrane to have the at least one electrically conductive layer be electronically connectable to respective signal generators, wherein the at least one electrically conductive layer forms membrane switches for the signal generators.

22. The towbar head as claimed in claim 21, wherein at least one of the membrane switches is located on the circuit board and is configured to generate one of a stepless and a multi-stage control signal, and at least one of the membrane switches is located on the circuit board and is configured to generate an on/off control signal.

23. The towbar head as claimed in claim 21, wherein at least one of the membrane switches includes a plurality of contact surfaces located on the circuit board.

24. The towbar head as claimed in claim 21, wherein at least one of the membrane switches has at least one resistance track located on the circuit board.

25. The towbar head as claimed in claim 23, including at least one of the electrically conductive layers connectable with one of a contact area and a resistance track on the circuit board by a pressure force exerted on the membrane.

26. The towbar head as claimed in claim 21, wherein at least one of the membrane switches has at least one pressure-sensitive resistance membrane.

27. The towbar head as claimed in claim 21, wherein the signal generators located on the circuit board are formed by membrane switches.

28. The towbar head as claimed in claim 25, wherein electrical components fastened to the circuit board are located on a side of the circuit board facing away from the membrane.

* * * * *